United States Patent
Gong

(10) Patent No.: US 9,178,722 B1
(45) Date of Patent: Nov. 3, 2015

(54) ROAMING METHOD AND APPARATUS FOR VOIP HANDSET

(75) Inventor: Yubin Gong, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 2096 days.

(21) Appl. No.: 11/932,126

(22) Filed: Oct. 31, 2007

Related U.S. Application Data

(60) Provisional application No. 60/866,136, filed on Nov. 16, 2006.

(51) Int. Cl.
| | |
|---|---|
| *H04L 12/66* | (2006.01) |
| *H04W 28/04* | (2009.01) |
| *H04W 4/00* | (2009.01) |
| *H04L 12/28* | (2006.01) |
| *H04L 12/56* | (2006.01) |
| *G06F 15/173* | (2006.01) |

(52) U.S. Cl.
CPC ............. *H04L 12/66* (2013.01); *H04W 28/04* (2013.01)

(58) Field of Classification Search
USPC ............................ 370/352, 329, 401; 709/223
See application file for complete search history.

(56) References Cited

U.S. PATENT DOCUMENTS

2008/0037469 A1 * 2/2008 Hamilton et al. ............. 370/331

OTHER PUBLICATIONS

Azimuth Smooth Roaming Benchmark Application, Azimuth Systems, Inc., Jul. 11, 2006 (53 pages).
"Information technology—Telecommunications and information exchange between systems—Local and metropolitan area networks—Specific requirements—Part 11: Wireless LAN Medium Access Control (MAC) and Physical Layer (PHY) specifications", ISO/IEC 8802-11, ANSI/IEEE Std 802.11, 1999, 531 pages.

* cited by examiner

*Primary Examiner* — Khaled Kassim

(57) ABSTRACT

A Voice Over Internet Protocol (VoIP) telephone includes a radio circuit to communicate with a current access point (AP) and other APs of a wireless communication network and a memory to store a scan table. The scan table includes information about candidate APs of the wireless communication network. The information is obtained from probe response transmissions received by the radio circuit from the respective candidate APs after transmission of probe requests from the VoIP telephone. The VoIP telephone further includes a controller which is operable to initiate a roaming process when communication between the VoIP telephone and the current AP degrades. The controller includes several applications, including an application to select a best candidate AP from the scan table, to terminate a voice call with the current AP and to resume the voice call through the radio circuit with the best candidate AP without disrupting the voice call.

21 Claims, 8 Drawing Sheets

ROAMING METHOD AND APPARATUS FOR VOIP HANDSET

CROSS-REFERENCE TO RELATED APPLICATION

This application claims the benefit of U.S. Provisional Application No. 60/866,136, filed Nov. 16, 2006, which is hereby incorporated by reference in its entirety.

BACKGROUND

The present invention relates generally to radio communication devices. More particularly, the present invention relates to a roaming design for a Voice Over Internet Protocol handset and a related system.

Wireless Local Area Network (WLAN) systems have been developed to permit network access for portable devices. Communication is carried out using radio waves or another wireless medium. One conventional system permits radio communication between two stations in the network according to an air interface standard known as IEEE 802.11, promulgated by the Institute of Electrical and Electronics Engineers, Inc. The standard defines frequencies, modulation and data encoding for two-way communication over a radio channel. A computer such as a portable or laptop computer equipped with a suitable radio circuit can receive and transmit signals in communication with a remote radio. The remote radio may be portable as well or may be fixed.

For network access by portable devices, the network includes one or more Access Points (APs). An AP is typically fixed at a location and provides access to a wire line network. An AP serves as a base station for wireless enabled portable or fixed devices to communicate with. Such devices that communicate with an AP are referred to as client stations. The set of all stations that can communicate with each other is referred to as a basic service set (BSS). Every BSS is defined by an identification (ID) called the BSSID. The BSSID is the media access control (MAC) address in the network of the access point which serves the BSS. An extended service set (ESS) is a set of connected BSSs. APs in an ESS are connected by a distribution system. Each ESS has an ID called the SSID which is a 32-byte character string.

WLAN systems have proven to be commercially successful for providing convenient, portable network access for data devices. Users have convenient access to remotely stored data over the WLAN. When the WLAN has access to the Internet, the local user may also access all the resources of the Internet. Data communication is relatively fast and very reliable.

However, many situations require not just data communication but voice communication instead or as well. For example, a business or other enterprise may have facilities which are spread over several floors in a building or over several buildings on a campus. It is desirable for individuals to move around the building or campus and take data and voice communication with them.

At present, many users with WLAN access for data communication must use a wire line telephone for voice communication. This limits the user's mobility as the user must remain in the location of a wire line telephone. Alternatively, the user can obtain another radiotelephone device such as a cellular telephone to place and receive calls using the cellular system. However, this arrangement has several drawbacks. First, cellular coverage may be unreliable, especially inside buildings, so that a call may be dropped or unable to be completed. Further, cellular service is relatively expensive, being billed on a per-minute basis. Especially for small or medium-size companies or individuals needing voice communication services, these problems limit the value of current voice communication solutions.

Telephones using Voice Over Internet Protocol (VoIP) are known which can communicate with a WLAN. However, such devices are limited to the radio communication range of the AP. This distance may be as small as 10 meters. While this provides some user mobility, full mobility around, for example, a building or campus would be preferred.

SUMMARY

The present invention is defined by the following claims, and nothing in this section should be taken as a limitation on those claims.

By way of introduction, the embodiments described below provide a Voice Over Internet Protocol (VoIP) telephone which includes a radio circuit to communicate with a current access point (AP) and other APs of a wireless communication network and a memory to store a scan table. The scan table includes information about candidate APs of the wireless communication network. The information is obtained from probe response transmissions received by the radio circuit from the respective candidate APs after transmission of probe requests from the VoIP telephone. The VoIP telephone further includes a controller which is operable to initiate a roaming process when communication between the VoIP telephone and the current AP degrades. The controller includes several applications, including an application to select a best candidate AP from the scan table, to terminate a voice call with the current AP and to resume the voice call through the radio circuit with the best candidate AP without disrupting the voice call. Other embodiments are provided, and each of the embodiments described herein can be used alone or in combination with one another.

In one example, a Voice Over Internet Protocol (VoIP) telephone is provided. The VoIP telephone includes radio means for communicating with a current access point (AP) and other APs of a wireless communication network and memory means for storing a scan table. The scan table includes information about candidate APs of the wireless communication network. The candidate APs include at least the other APs. The information is obtained from transmissions received by the radio circuit from a respective candidate AP. The VoIP telephone further includes processing means coupled with the radio circuit and the memory for initiating a roaming process when communication between the VoIP telephone and the current AP degrades. The processing means includes means for selecting a best candidate AP from the scan table, means for handing over a voice call including means for terminating the voice call with the current AP and means for resuming the voice call through the radio circuit with the best candidate AP.

In another example, the VoIP telephone includes means for transmitting probe requests to the candidate APs when the voice call is not active and means for receiving probe responses thereto, including means for updating the scan table in the memory with information received in the probe responses. In another example, the VoIP telephone includes timer means for timing a scan time duration between transmissions of the probe requests.

In another example, a computer-readable medium is provided, the medium having computer-readable content to cause a computer of a voice communication device in a wireless communication network to perform acts of scanning for candidate APs on the wireless communication network while the voice communication device is associated with a current access point (AP) of the wireless communication network, storing information about the candidate APs in a scan table at the voice communication device and, when a signal parameter for radio communication between the voice communication device and the current AP degrades, roaming to one of the candidate APs. In another example, the computer-readable medium further includes computer-readable content for transmitting probe requests during inactive periods of the voice communication device, receiving probe responses from the candidate APs during the inactive periods, and updating the scan table with information about the candidate APs obtained from the probe responses.

In one example, roaming comprises identifying a best candidate AP among the candidate APs in the scan table and sending an authenticating communication to the best candidate AP. In another example, roaming further comprises exchanging authentication messages with an authentication server on the wireless communication network and exchanging handshaking messages with the new candidate AP. In yet another example, roaming comprises discontinuing a voice call with the current AP and commencing the voice call with the new candidate AP without noticeably interrupting the voice call.

In another example, a method for operating a mobile handset in a wireless local area network (WLAN) includes, during a call between the mobile handset and an active access point (AP) on a first radio channel, signaling the active AP from the mobile handset that the mobile handset is entering a power save state, then switching the mobile handset to a second radio channel. The method then includes transmitting from the mobile handset probe requests to other APs that may be available for radio communication with the mobile handset, and, if probe responses to the probe requests are received from the other APs, retrieving AP identification information from the probe responses. The method then includes updating a scan table by adding the AP identification information to the scan table. In another example, the method further includes switching the mobile handset to the first radio channel after updating the scan table and exiting the power save state to resume the call with the active AP.

This example may also include monitoring a signal parameter from the active AP at the mobile handset and, when the signal parameter exceeds a predetermined threshold, selecting a new AP from the scan table, and initiating communication with the new AP.

This example may also include transmitting a NULL packet from the mobile handset with PM set equal to 1 before switching to the second radio channel to inform the active AP that the mobile handset is entering the power save state. The example may still further include transmitting a NULL packet from the mobile handset with PM set equal to 0 to inform the active AP that the mobile handset is exiting the power save state.

In another example, a mobile handset for voice communication with a wireless local area network (WLAN) is provided. The mobile handset includes means for radio communication with one or more wireless access points (APs) including an active AP and candidate APs and roaming means coupled with the means for radio communication for terminating communication with the active AP and initiating communication with a selected candidate AP. In this example, the roaming means includes means for identifying candidate APs based on probe responses received from the candidate APs during inactive voice communication periods and comparison means for determining when a signal parameter from the active AP exceeds a threshold indicative of terminating communication with the active AP.

In another example, the mobile handset further includes memory means for storing a scan table including information about the candidate APs and selection means for identifying a best candidate AP as the selected candidate AP for initiation of communication. In yet another example, the mobile handset of claim 30 wherein the roaming means is operative for terminating voice communication with the active AP and initiating voice communication with the selected candidate AP without interrupting the voice communication.

In yet another example, a mobile handset for voice communication with a wireless local area network (WLAN) is provided and includes a radio communication circuit to communicate a voice call with one or more remote access points (APs) of the WLAN, the radio communication circuit communicating over a specified radio channel. The mobile handset further includes a memory and a controller coupled to the radio communication circuit to control transmission and reception of information with the one or more APs. The controller is operative to change the radio communication circuit to a new radio channel for background scanning and start a time-out timer having a predetermined duration. In conjunction with the radio communication circuit, the controller operates to initiate a probe request to other APs and, in conjunction with the radio communication circuit, detect a probe response to the probe request from the other AP. The controller then operates to update a scan table stored in the memory with information about the other AP and, when the time-out timer expires, return the communication circuit to a working radio channel.

In another example, a mobile handset for voice communication in a wireless local area network (WLAN) is provided. The mobile handset includes means for entering a power save state of the mobile handset, means for selecting a radio channel for background scanning prior to entering the power save state of the mobile handset and means for timing a time-out duration. The mobile handset further includes means for sending a probe request to one or more access points (APs) and means for detecting a probe responses sent from the one or more AP. The mobile handset further includes means for updating a scan table with information about a responding AP if a probe response is received from an AP and means for returning to a working radio channel after the time-out duration and re-entering the power save state.

In another example, a method for operating a mobile handset in a wireless local area network (WLAN) is provided. The method includes, during a call between the mobile handset and an active access point (AP) on a first radio channel, retrieving a last-measured received signal strength value and using the last-measured received signal strength value, determining a background scan interval. The method further includes entering a background scan process. This may include switching the mobile handset to a second radio channel and transmitting from the mobile handset probe requests to other APs that may be available for radio communication with the mobile handset. If probe responses to the probe requests are received from other APs, retrieving AP identification information from the probe responses and updating a scan table by adding the AP identification information to the scan table for possible handover of communication from the active AP to another AP. The background scan process then continues until the scan interval is expired, then powering down the mobile handset. Further in this example, determining the background scan interval may include using the last-measured received signal strength value as an index to a table of background scan interval values.

In yet another example, a mobile handset for voice communication with a wireless local area network (WLAN) is provided and includes a radio communication circuit to communicate a voice call with one or more remote access points (APs), a memory and a controller coupled to the radio communication circuit to control transmission and reception of information with the one or more APs. The controller operative to signal an active AP that the mobile handset is entering a power save state and to switch a radio channel on which the radio communication circuit communicates from a first channel to a second channel. The controller is further operative to communicate probe requests to identify other APs available for voice communication with the mobile handset, receive any probe responses to the probe request and retrieve AP identification information from received probe requests. The controller is then operative to update a scan table stored in the memory with the retrieved AP identification information. In another example, the controller of the mobile handset is further operative to detect a signal parameter for the voice call and, when the signal parameter does not exceed a predetermined threshold, select a new AP from the scan table and then cause the radio communication circuit to initiate communication with the new AP.

A further example provides a mobile handset for voice communication with a wireless local area network (WLAN). The mobile handset includes means for radio communication with one or more wireless access points (APs) including an active AP and candidate APs and roaming means coupled with the means for radio communication for terminating communication with the active AP and initiating communication with a selected candidate AP without interrupting the voice communication. In an example, the roaming means includes scanning means for determining a scan interval based on a signal parameter value, means for identifying candidate APs based on probe responses received from the candidate APs during inactive voice communication periods which are timed by the scan interval, and comparison means for determining when a signal parameter from the active AP exceeds a threshold indicative of terminating communication with the active AP. In a further example, the mobile handset further includes table means for storing scan interval values and for providing the scan interval in response to a received signal parameter value. And in yet a further example, the signal parameter value comprises a received signal strength value.

The embodiments will now be described with reference to the attached drawings.

DETAILED DESCRIPTION

Figure 1:
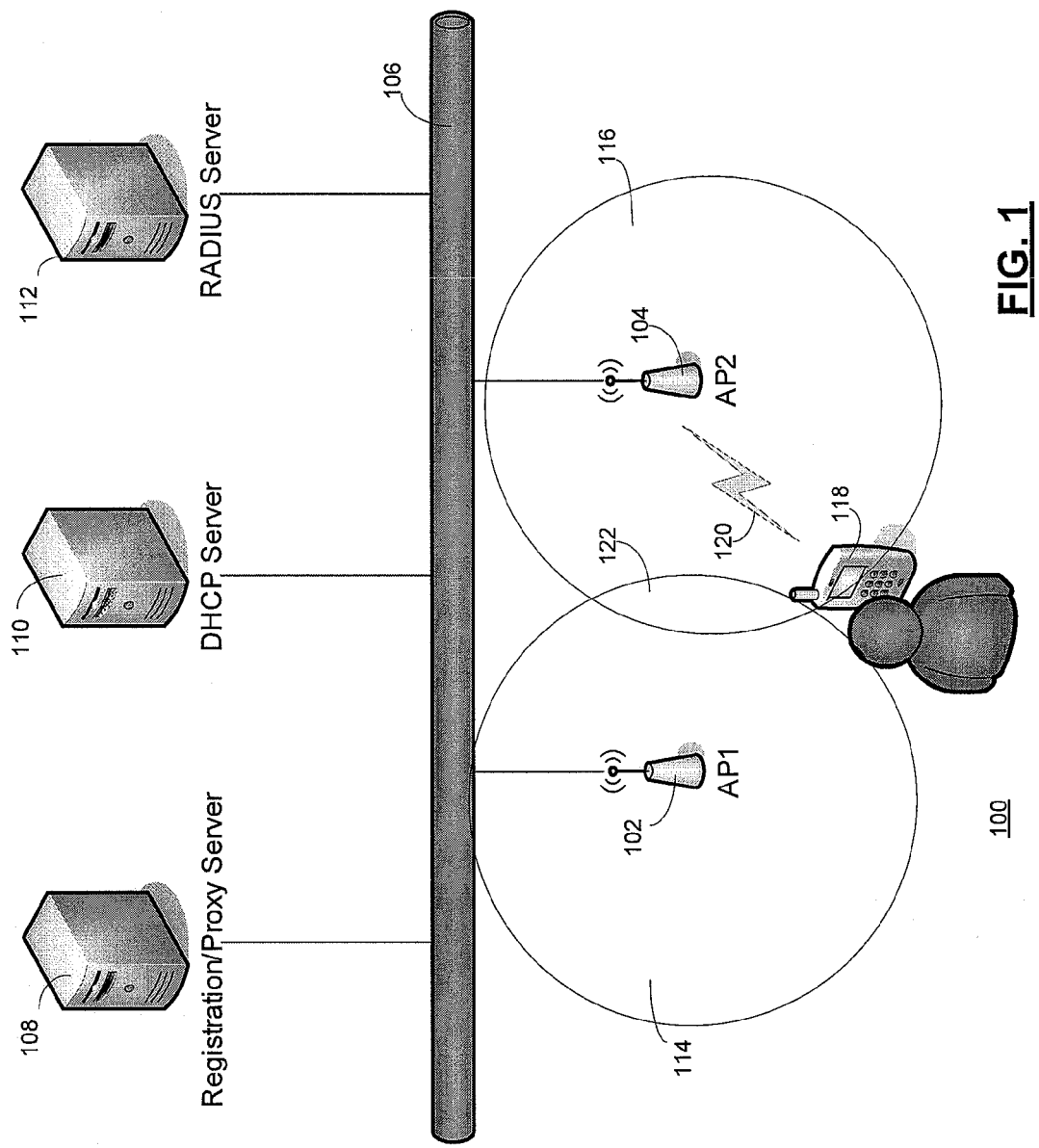
FIG. 1 is a block diagram of a WLAN.

FIG. 1 is a block diagram of a Wireless Local Area Network (WLAN) 100. The WLAN 100 includes a first access point (AP) 102, a second AP 104, a network 106, a registration proxy server 108, a dynamic host configuration protocol (DHCP) server 110 and a remote authentication dial-in user service (RADIUS) server 112. The WLAN 100 illustrated in FIG. 1 is intended to be exemplary only. In typical embodiments, the WLAN 100 will include any suitable number of APs, some, none or all of the servers 108, 110, 112, and may include other components as well. The WLAN 100 may be coupled to other networks including the Internet. The WLAN 100 provides data communication according to one or more suitable protocols, such as transmission control protocol/Internet protocol (TCP/IP) or Ethernet. In accordance with the present embodiments, the WLAN 100 also provides voice communication using a suitable protocol, such as voice over internet protocol (VoIP).

The first AP 102 and the second AP 104 provide data and voice communication using a wireless communication protocol such as that commonly referred to as IEEE 802.11 or WiFi. In the illustrated embodiment, the first AP 102 communicates with devices in a service area 114. Similarly, the second AP 104 communicates with devices in a service area 116. To communicate with the APs 102, 104, a device must include a radio circuit capable of implementing the specified radio protocol and must be located in the respective service area. Typical devices which may communicate with the APs 102, 104 include portable devices such as laptop computers or personal digital assistants as well as fixed devices such as desk top computers. In general, any data processing device having a suitable radio may communicate with the APs 102, 104.

In the illustrated embodiment, the APs 102, 104 communicate with a mobile handset 118. The mobile handset 118 operates as a radio telephone, providing voice communication with the WLAN 100. The mobile handset 118 will be described in greater detail below in conjunction with FIG. 2. In general, the mobile handset 118 may be actuated by a user to place and receive calls with an AP such as AP 102 and AP 104 using the wireless communication protocol. The mobile handset 118 can communicate with one AP at a time over a radio communication link 120. For full mobility, a method and apparatus for roaming, or handing over communication from one AP such as first AP 102 to another AP such as second AP 104 without noticeably interrupting the call for a user, are required. Such method and apparatus will be described below in conjunction with FIGS. 3-8.

The network 106 provides data communication among devices coupled to the network. The network 106 includes wire line and wireless portions. Communication is performed according to one or more data communication protocols such as Ethernet or TCP/IP.

The registration proxy server 108 provides registration of devices which access the WLAN 100. When a new device such as the mobile handset 118 accesses the network through an AP such as first AP 102 or second AP 104, the registration proxy server 108 identifies which AP is accessed so that future network communications for the device can be directed to the proper AP. Registration also involves maintaining a record of the capabilities of the device. If a device moves from the service area of one AP to the service area of another AP, the registration proxy server 108 updates the registration information for the device.

The DHCP server 110 implements Dynamic Host Configuration Protocol (DHCP) for the WLAN 100. DHCP is used by a communicate system to allow a device to request and obtain an internet protocol (IP) address from the DHCP server 110. The DHCP server 110 also provides other information such as a default gateway, subnet mask and IP addresses of other servers. This information is necessary so that the accessing device can be addressed within the WLAN 100. When a device such as the mobile handset 118 accesses an AP such as first AP 102 or second AP 104, the DHCP server 110 provides the necessary address and other information to locate the device in the network.

The RADIUS server 112 is a server which implements the Remote Authentication Dial-In User Service (RADIUS). RADIUS is a client/server protocol that enables remote access servers to communicate with a central server to authenticate users and to authorize their access to the requested system or service. When a mobile device such as mobile handset 118 accesses the system by initiating communication with an AP such as first AP 102 or second AP 104, the RADIUS server 112 provides the authentication service.

While the WLAN 100 may be applied in the widest variety of embodiments to solve an unlimited range of communication needs, one particular embodiment envisioned herein implements a voice and data communication network in an enterprise environment. The WLAN 100 in such an environment operates over a geographically limited area, such as within a single building, on multiple floors of a single building, or among several buildings on an enterprise campus.

The enterprise may be a small to medium size business with facilities at a single location. Within the buildings or campus of the enterprise, there are a number of wireless access points such as first AP 102 and second AP 104. The APs may be of any suitable design, including conventional retail devices which may be purchased and installed at minimal expense, yet provide substantial communication capability for the enterprise.

A user may place or receive a call with the first AP 102 using the mobile handset 118. At the beginning of the call, the mobile handset 118 is in service area 114 served by the first AP 102. Since the mobile handset 118 may be transported, the user in this example carries the mobile handset 118 to a new location which is in service area 116 served by second AP 104.

During this process, the communication quality between the mobile handset 118 and the first AP 102 will deteriorate or degrade as the mobile handset 118 reaches the limits of the service area 114. At the edge of the service area 114, the distance between the two devices, structures such as building members come between the devices and interference all cause the quality of communication to decrease. This may be reflected in decreased received signal strength (RSSI) at the mobile handset 118, increased bit error rate, decreased signal to noise ratio (SNR), increased noise floor, or in any other suitable signal parameter. Similarly, the communication quality available between the mobile handset 118 and the second AP 104 will improve as the physical distance between the two device decreases.

At some point, the mobile handset 118 may be in a service area such as service area 122 which is served by both first AP 102 and second AP 104. Using a wireless access protocol such as 802.11, the mobile handset 118 can only communicate with one radio at a time. Thus, it is not possible to communicate with both the first AP 102 and the second AP 104 to arrange a handover of communication. Since a voice call is in progress, and since voice data is isochronous, to maintain acceptable quality of service, the transfer of communication from the first AP 102 to the second AP 104 must be seamless and very rapid. A switching time of no more than 100 ms will maintain acceptable quality of service.

Figure 2:
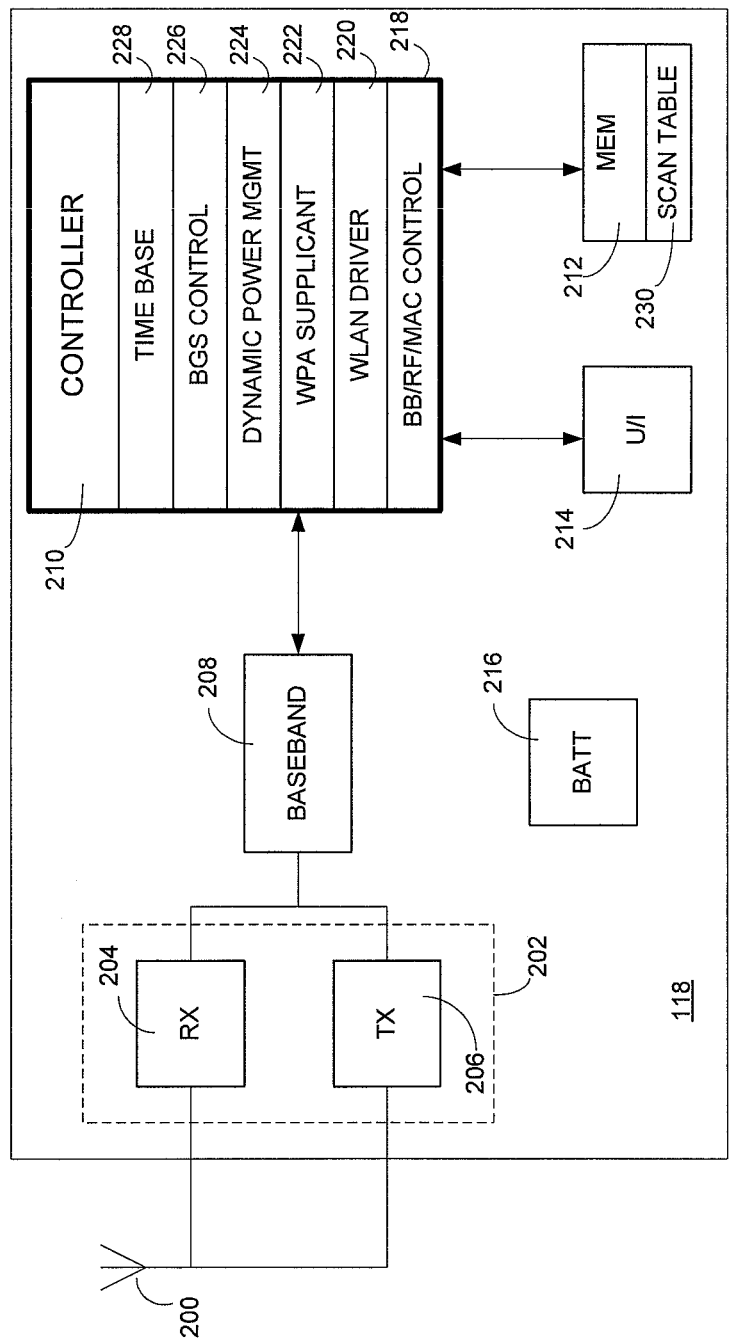
FIG. 2 is a block diagram of a mobile handset for use in the WLAN of FIG. 1.

FIG. 2 is a block diagram of a mobile handset 118 for use in the WLAN of FIG. 1. The mobile handset includes an antenna 200, a communication circuit 202 including a receiver 204 and a transmitter 206, a baseband circuit 208, a controller 210, memory 212 and a user interface 214. The mobile handset 118 is powered by a battery 216.

In some embodiments, the mobile handset may be implemented as a portable radio usable by a user like a cellular telephone or cordless telephone. In other embodiments, the mobile handset may be structurally integrated with another device such as a personal digital assistant, laptop computer or desktop computer. In such an embodiment, the mobile handset 118 may employ structures of the device in which it is incorporated, such as a common communication circuit 202 or a common memory 212. The structure and operation described herein may be extended to other devices as well.

The communication circuit 202, the baseband circuit 204 and the antenna 200 combine to provide radio communication with a remote radio such as an AP 102, 104 (FIG. 1). The operation of the baseband circuit 204 to encode data, the transmitter 206 to modulate a carrier wave and the receiver 204 to demodulate a received carrier may be conventional. An air interface standard such as 802.11 or WiFi defines physical parameters such as channel frequencies, data rate, packet size and content. These physical parameters are implemented by the communication circuit 202 and the baseband circuit 204. The receiver 204 produces information about one or more signal parameters, such as RSSI, signal to noise ratio, noise floor, bit error rate, etc., and supplies this information for use by the controller 210.

The controller 210 controls operation of the mobile handset 118. The controller 210 may be implemented using any suitable digital processing device such as a microprocessor, microcontroller or digital signal processor or combination of these. The controller 210 includes a logic device which responds to data and instructions stored in memory 212 or received using the communication circuit 202.

In the exemplary embodiments herein, the controller 210 implements several applications or routines. A first routine is named BB/RF/MAC routine 218. This routine controls the radio frequency (RF), base band (BB) and media access control (MAC) portions of the mobile handset 118. A second routine named the WLAN Driver 220 implements networking functions in conjunction with the WLAN 100 of FIG. 1. A third routine named the Wi-Fi Protected Access (WPA) supplicant 220 implements higher-level routines using the WLAN Driver 220. A fourth routine named dynamic power management 224 controls power dissipation in the mobile handset 118 to extend the life of the battery 216. A fifth routine called Background Scan (BGS) control 226 implements background scan routines for identifying other APs available for communication with the mobile handset, as will be described herein. A sixth routine implements a time base 228 which performs functions such as setting timeout timers, counting up or counting down to time a predetermined duration and indicating when a set time has elapsed. One or more hardware timers may be provided as well. The controller 210 may implement any number of other high level or lower level functions for controlling the operation of the mobile handset 118.

The memory 212 stores data and instructions for use by the controller 210 and other portions of the mobile handset 118. The memory may include both volatile memory, such as dynamic read-write memory, and non-volatile memory such as flash and other semiconductor memory, optical and magnetic disk storage. The memory 212 may be apportioned in any suitable way and some portion of the memory 212 may be integrated with the controller 210 for improved performance or reduced size or manufacturing cost.

The user interface 214 provides user control of the mobile handset 118. In one embodiment, the user interface 214 includes a keypad, display, microphone and speaker. The keypad allows data entry and the display allows data display for the user. The microphone detects audible sound such as speech and converts the speech to electrical signals which may be sampled and encoded as digital data, for example, by the controller or another digital signal processor. The speaker converts electrical signals to audible sound for the user.

For voice communication, the mobile handset 118 detects speech received at the user interface 214 and converts the speech to digital data. The data are encoded using VoIP. The data are transmitted from the mobile handset 118 to an AP 102, 104 using 802.11 protocol on an uplink. On a downlink, VoIP data are transmitted to the mobile handset 118 using the 802.11 protocol. The data are used to produce audible sound to be heard by the user. During times when the mobile handset 118 is inactive, or when portions of the mobile handset 118 are inactive, all or portions of the mobile handset are powered down to reduce power consumption and prolong the life of the battery 216.

Also during periods when the mobile handset 118 is not actively engaged in communicating data for a voice call, the mobile handset 118 performs a background scan (BGS) for available APs which are candidates for roaming. Roaming or handover occurs when the mobile handset 118 drops an existing radio link with an active AP and initiates a new radio link with a candidate AP without interrupting communication on the radio link. If the mobile handset 118 is moved to a location where the communication quality of service is below a threshold, the mobile handset 118 will discontinue communication with the active AP and resume communication with a new AP which has the best available signal quality. The new AP will be selected from a scan table 230 which stores information about candidate APs which have been detected. The scan table may be stored in memory 212, for example. In the embodiment, communication is switched from the active AP to the new AP in 100 ms or less so as to not disrupt the active voice call. Any longer delay may be audible to the user and may reduce the quality of service provided by the mobile handset 118.

Figure 3:
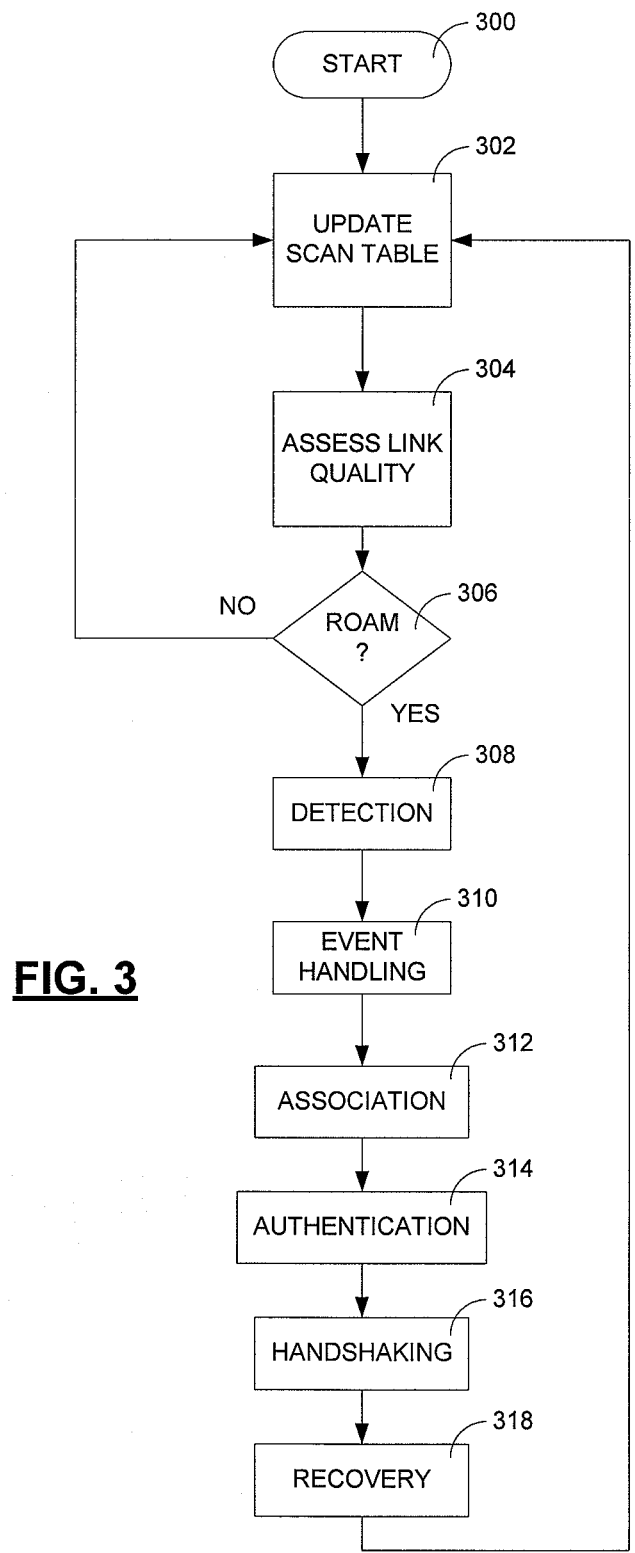
FIG. 3 is a flow diagram illustrating operation of the WLAN of FIG. 1.

FIG. 3 is a flow diagram illustrating operation of the WLAN of FIG. 1. More particularly, FIG. 3 illustrates a roaming procedure for use in the mobile handset 118 of FIG. 2. In the illustrated procedure, a background scan process occurs when the mobile handset 118 is not actively engaged in a call with a current AP. Even if the mobile handset 118 is engaged in a call, the background scan will occur during times when packets are not presently being communicated. During the background scan process, the scan table is populated and updated with information about candidate APs. The candidate APs are APs to which communication may be handed over when signal quality from the current AP degrades to a certain degree. The procedure begins at block 300.

At block 302, the mobile handset 118 updates the scan table 230 stored in the memory 212. In the embodiment of FIG. 2, the WLAN Driver routine 220 becomes operational to detect APs which are sufficiently close by for reception of their transmissions. The APs stored in the scan table 230 may be considered to be candidate APs, as they are candidates for dropping a radio link between the mobile handset 118 and the current AP and instead establishing a radio link between the mobile handset 118 and one of the candidate APs.

Two types of AP transmissions are used for updating the scan table 230. First, beacons are periodically transmitted by each AP and used for synchronization and registration by devices accessing the WLAN 100 through an AP. APs periodically sends a beacon frame to announce their presence and relay information, such as timestamp, SSID, and other parameters regarding the access point to radios that are within range. Radios such as the mobile handset 118 continually scan all 802.11 radio channels and listen to beacons as the basis for choosing which access point is best to associate with. Second, the mobile handset 118 transmits probe requests and, if a probe request is received by an AP, the AP transmits a probe response. The WLAN Driver 220 of the mobile handset 118 uses information in a received beacon or a received probe response to update the scan table 230.

The scan table 230 may be stored in any suitable location of the mobile handset, using any suitable format. In one embodiment, each entry of the scan table 230 is stored with the following information in categories:

BSS info, including BSSID, SSID, Beacon period, Delivery Traffic Indication Message ("DTIM"), channel and capabilities;
Security and corresponding Information Elements (IEs);
WiFi Multimedia ("WMM") IEs
RSSI/SNR/Noise floor;
Derived information, for usage by the WLAN Driver 220; and
Time Stamp, for aging purposes.

One exceptional case must be handled. In some cases, an AP transmitting a beacon hides its SSID in the beacon frame. In that case, the SSID IE length is either zero or else all characters of the SSID is replaced with a binary 0 value. In such a case, the WLAN Driver 220 does not validate against the SSID. Instead, the WLAN Driver 220 validates using the BSSID only and copies the known SSID string into the scan table 230.

In a further example, contents of the scan table 230 are updated to reflect aging of the table entries. Each scan table entry may include a time stamp indicating a transmission time of the data contained in the entry, or an update time for previously-stored entries. If the time stamp information exceeds a predetermined aging time or time duration, the scan table entry is deleted from the scan table entry 230. The aging time or time duration may be configured using any suitable criteria. The purpose of removing aging table entries is to ensure that the scan table only has real time or up-to-date information about APs neighboring the mobile handset 118.

One exemplary data structure for storage in the scan table 230 is shown below:

```
typedef struct _SCAN_ENTRY
{
    unsigned int dirty;
    unsigned int time_stamp;
    unsigned char *bssid;
    unsigned char *ssid;
    unsigned char *wpa_ie;
    unsigned char *rsn_ie;
    unsigned char *wmm_ie;
    int freq;
    unsigned short caps;
    int qual;
    int noise;
    int level;
    int maxrate;
    unsigned char channel;
    unsigned char band;
    unsigned char adhoc;
    unsigned short bcn_period;
    unsigned short dtim_period;
    unsigned char wepEnabled;
```

```
    unsigned char wpaEnabled;
    unsigned char wpa2Enabled;
    unsigned char wmmEnabled;
    unsigned char uapsdEnabled;
};
```

This data structure is intended to be exemplary only. It illustrates a general format for arranging and storing scan results from the WLAN Driver 220. Any other application called by the controller 210 or which calls the WLAN Driver 220 should convert any driver- or operating system-specific scan results into this format.

At block 304, the mobile handset 118 assesses the quality of the radio link from the current AP to the mobile handset 118. The link quality can be determined in any of a wide variety of ways. One technique includes comparing a signal parameter with a predetermined threshold for that parameter. Example parameters include RSSI, SNR, noise floor and bit error rate. Conventional receiver circuits such as receiver 204 provide an RSSI indication, so RSSI is a parameter that is readily available to the controller 210 of the mobile handset. In an 802.11 system, values for RSSI and SNR are contained in the header of every received packet. Further SNR considers both RSSI and noise floor so it may be a more accurate or reliable criterion. Still further, the parameters such as RSSI may be averaged over a number of received packets or consecutive packets in order to minimize the effect of temporary deviations, such as when the mobile handset 118 is transported and enters a signal fade. The following formula is an example of an averaging technique:

$$\text{averaged\_rssi} = ((\text{averaged\_rssi} << n) - \text{averaged\_rssi} + (\text{new\_sample} << n)) >> n$$

where n is a scale factor. And x<<n means shifting a number x left by n bits. This formula operates to smooth received signal strength values.

Another criterion for assessing quality of the radio link involves tracking received transmissions from the current AP. For example, if the mobile handset 118 failed to receive a specified number of beacons consecutively, the criterion is considered to have failed and the link quality has degraded.

Another criterion for assessing quality of the radio link involves tracking received transmissions from the mobile handset 118 to the current AP. If the mobile handset 118 failed to transmit for a number of consecutive frames due to failure to receive an acknowledgement (ACK) from the AP, the link may be considered to have degraded. In general, in a wireless LAN system such as an 802.11 system, after receiving a data frame, the receiving station will utilize error checking processes to detect the presence of errors. The receiving station will send an ACK frame to the sending station if no errors are found. If the sending station doesn't receive an ACK after a period of time, the sending station will retransmit the frame. Receipt of the ACK frame serves as on possible quality criterion. Further, combinations of these criteria or alternative link quality criteria may be used as well to assess the quality of the radio link.

If the radio link quality is acceptable, there is no need to change the radio link. Thus, at block 306, the mobile handset 118 determines if there is a need to roam, or to change its radio connection to the WLAN 100 from the current AP to one of the candidate APs stored in the scan table 230. The determination of block 306 may be based on one or more of the criteria assessed in block 304. If there is no need to roam, control returns to block 302 where the scan table 230 is updated. On the other hand, if link quality has degraded so that a roaming operation should occur, control proceeds to block 308 to begin the roaming operation. In the embodiment of FIG. 2, the WLAN Driver 220 determines that a roaming operation should occur and sends a roam request event to the WPA Supplicant 222 of the mobile handset 118. The WPA Supplicant 222 retrieves the contents of the scan table 230. The WPA Supplicant 222 then locates the best candidate AP among those stored in the scan table data based on predetermined criteria.

The roaming operation illustrated by blocks 308, 310, 312, 314, 316 and 318 are in accordance with the WiFi or 802.11 standard. In other systems in which the present techniques may be implemented, the roaming operation may include other operations. Thus, the following description with respect to a WiFi system should be considered to be illustrative only.

At block 308, a WiFi Detection phase occurs. This is the time from the last acknowledgement of a data packet to the time the WLAN Driver 220 sends out a roam request event. This operation represents the majority of the time process required for the roaming operation.

At block 310, an Event Handling process occurs. This is the time the WPA Supplicant 222 takes to handle the roam request received from the WLAN Driver 220, retrieve the scan table 230 and find out the next best candidate AP. The WPA Supplicant then cleans up internal Media Access Control (MAC) Sublayer Management Entity (MLME) state machines and buffers, and finally initiates an 802.11 authentication process.

At block 312, an 802.11 Association process occurs. This occurs from the time at which the mobile handset 118 sends out an 802.11 authentication frame to the selected candidate AP until the mobile handset 118 receives the association response from the candidate AP. The 802.11 association process enables the AP to allocate resources for and synchronize with the mobile handset 118. The mobile handset 118 begins the association process by sending an association request to a candidate AP. This frame includes information about the handset, such as supported data rates, and the SSID of the network the mobile handset 118 wishes to associate with. After receiving the association frame with the association request, the AP considers associating with the mobile handset 118, and (if accepted) reserves memory space and establishes an association ID for the mobile handset 118.

In response to the association request frame, the AP sends an association response frame. The AP sends an association response frame containing an acceptance or rejection notice to the mobile handset 228 request for association. If the AP accepts the mobile handset 118, the association response frame includes information regarding the association, such as association ID and supported data rates. If the outcome of the association is positive, the mobile handset 118 can utilize the AP to communicate with other devices on the WLAN.

At block 314, an 802.1x Authentication process begins. 802.1x authentication is the time it takes for the mobile handset 118 to exchange authentication messages with the RADIUS Server 112 on the WLAN 100. This is applicable when 802.1x Extensible Authentication Protocol (EAP) is enabled. The mobile handset 118 begins the process by sending an authentication frame containing its identity to the AP. The mobile handset 118 sends only one authentication frame, and the AP responds with an authentication frame as a response indicating acceptance (or rejection).

With the optional shared key authentication in 802.11, the mobile handset 118 sends an initial authentication frame, and the AP responds with an authentication frame containing challenge text. The mobile handset 118 must send an encrypted version of the challenge text in an authentication frame back to the AP. The AP ensures that the mobile handset 118 has the correct key, which is the basis for authentication, by comparing the challenge text recovered after decryption with the challenge text that was sent previously. Based on the results of this comparison, the AP replies to the mobile handset 118 with an authentication frame signifying the result of authentication. This process is represented by block 316, in which four-way handshaking occurs.

During block 318, a recover process occurs. Recovery is the time from when the four-way handshaking of block 316 is done to acknowledgement of a first acknowledged data packet.

Following the recovery process, control returns to block 302 in which the scan table is updated with new information. The mobile handset 118 may enter a low power mode. If in an active call, the call continues. During this time, a background scan process continues to locate other candidate APs and update the scan table 230.

As illustrated in FIG. 3, a background scan operation is performed to update the scan table 230 at the mobile handset 118. The background scan (BGS) can be accomplished in any suitable manner. The nature of a specific BGS operation may depend on the system, current mode of operation or environment. FIGS. 4-8 illustrate exemplary BGS operations for a WiFi or 802.11 radio system.

In general, the BGS function can be enabled or disabled in the mobile handset 118. When BGS is enabled, a timer operated by the WLAN Driver 220 in conjunction with the time base 228 is activated to expire periodically. The timer duration may be varied by the application. When the time expires, a BGS request event is generated by the WLAN Driver 220. The event is then processed by the WPA supplicant 222.

Figure 4:
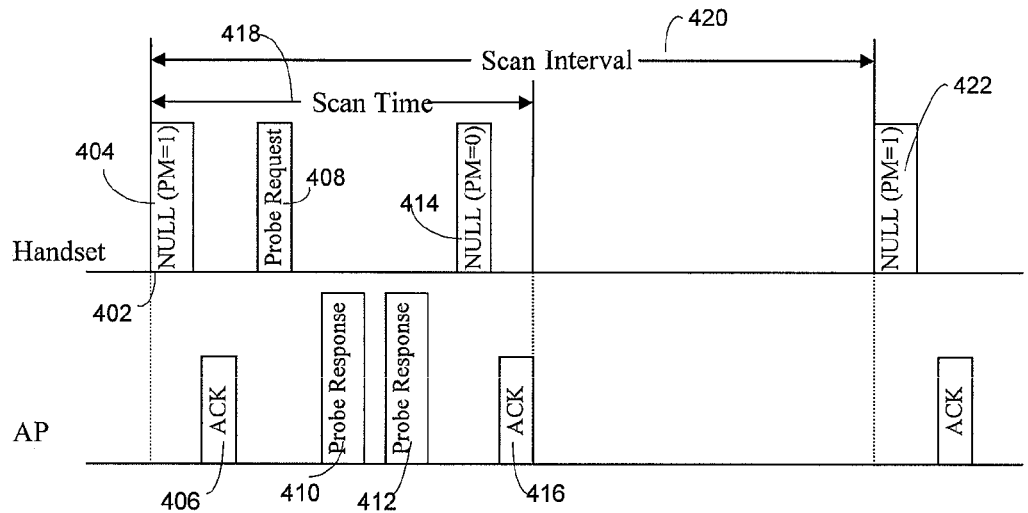
FIG. 4 is a timing diagram illustrating operation of the WLAN of FIG. 1.

FIG. 4 is a timing diagram illustrating operation of the WLAN of FIG. 1. In particular, FIG. 4 illustrates BSS operation in a mode in which there is no power save operation and the mobile handset 118 remains active at all times. In this mode, to avoid loss of packets transmitted by APs nearby, the mobile handset 118 informs the current AP that it will transition to a power save state to perform the BGS operation on another channel. This is done by sending a NULL packet with a power mode flag PM set equal to 1. The mobile handset 118 is then free to change its communication channel from the working channel to one or more scan channels. After the BGS operation and updating the scan table, communication is changed back to the working channel and the mobile handset 118 sends a NULL data packet with the power flag set to PM=0.

FIG. 4 illustrates this operation. The upper portion of the figure illustrates activity of the mobile handset 118. The lower portion of the figure illustrates activity of the current AP with which the handset is currently associated. At a starting time 402, the mobile handset 118 transmits a NULL packet 404 with the power flag set to PM=1. The mobile handset 118 communicates to the current AP that the handset 118 is entering power save mode. In response, the AP transmits and acknowledgement or ACK packet 406.

Upon receipt of the ACK packet 406, the mobile handset 118 transmits a probe request frame 408. A radio in an 802.11 system sends a probe request frame when it needs to obtain information from another station. For example, the mobile handset 118 sends the probe request frame 408 to determine which APs are within range. When one or more APs within range of the mobile handset 118 receive the probe request frame 408, the each AP responds with a probe response frame containing capability information, supported data rates, etc. Thus, a first AP such as AP 102 responds to the probe request frame 408 by transmitting a probe response frame 410. Subsequently, a second AP such as AP 104 responds to the probe request frame 408 by transmitting a probe response frame 410. If other APs are present, the other APs may detect the probe request frame 408 as well. They may also respond with a probe response frame.

After receipt of probe response frames 410, 412, the mobile handset 118 needs to notify the AP when it exits power save state. The mobile handset first changes its radio channel back to the channel used with the current AP, then transmits a NULL packet 414, this time with the power flag PM set equal to 0. The current AP receives the NULL packet 414 and responds with an ACK packet 416.

The period during which the probe request frame 408 and the probe response frames 410, 412 are communicated is referred to as a scan time 418. After elapse of a scan interval 420, the BGS process may be repeated and a next NULL packet 422 is transmitted with PM set equal to 1.

In response to each received probe response 410, 412, the mobile handset 118 updates the scan table 230. As noted, a probe response frame 410, 412 contains capability information, supported data rates, etc., for the transmitting AP. This information contained in the probe response frame is used to populate the scan table 230 or to update information in the scan table 230 if information about the transmitting AP has already been received.

Figure 5:
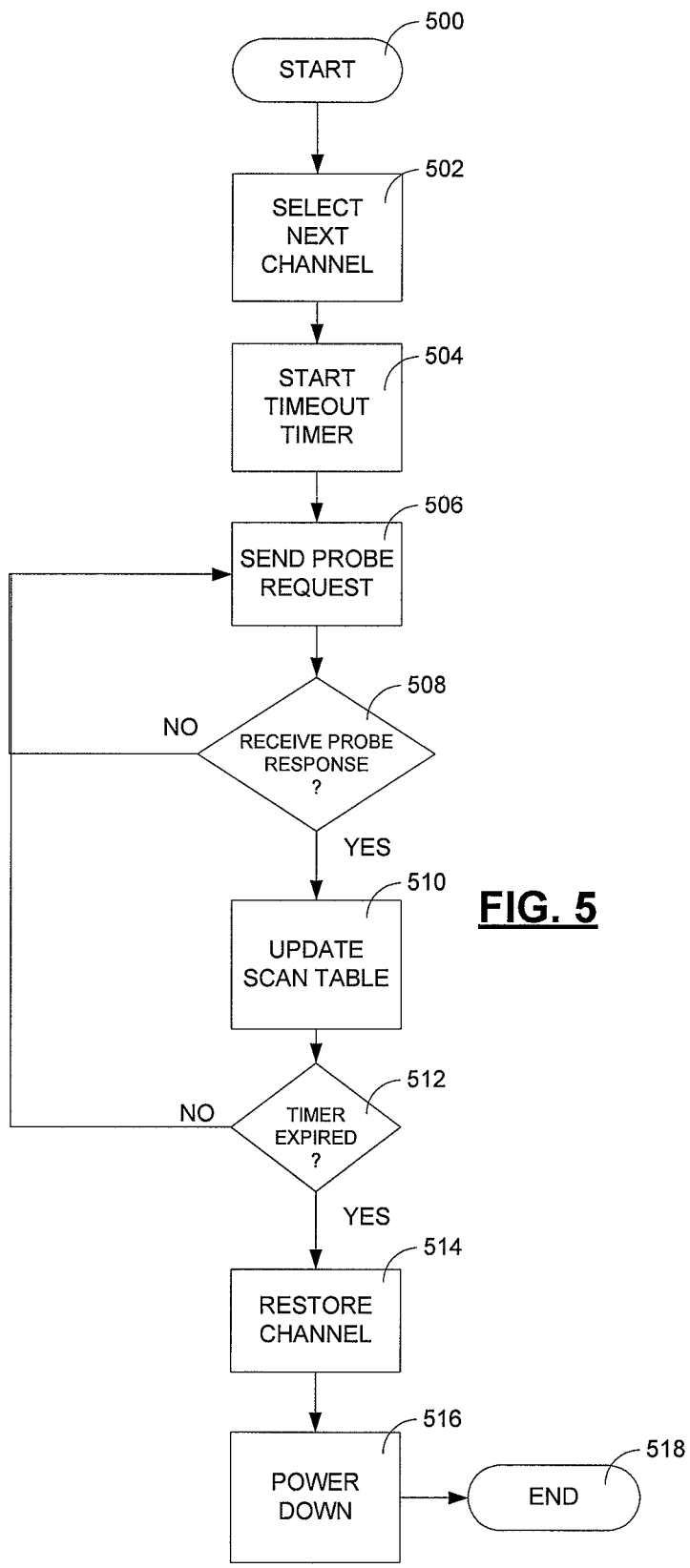
FIGS. 5-6 are a flow diagrams illustrating operation of the WLAN of FIG. 1.

FIG. 5 is a flow diagram illustrating operation of the WLAN of FIG. 1 for performing a BGS operation in a legacy power save mode. The WLAN 100 may be configured in a power save mode to match an earlier system specification. The operation is similar to that described above in conjunction with FIG. 4 for the case where no power save mode is active. In this mode, however, there is no need to transmit the NULL packet 404 before switching channels. In this mode, the BGS process is handled after the WLAN Driver 220 transitions into the power save state. Entry into and exit from the power save state is under control of the dynamic power management routine 224.

When no voice call is active at the mobile handset 118, the WLAN Driver 220 will determine to enter the power save state when a received beacon frame from the current AP indicates no more packets are pending for transmission to the mobile handset 118. The dynamic power management routine 224 will then transition the system into power save state. After going into the power save state, the mobile handset 118 could be awakened by the BGS timer in addition to other wakeup sources operating in the handset. In response to the BGS timer, the BB/RF/MAC routine 218 powers up the RF, base band and media access control portions of the mobile handset 118 so that packets can be received and transmitted.

When a call is active, the mobile handset 118 will never enter the low power state. The WLAN Driver 220 will be explicitly awakened upon a transmission request from the controller 210 and an inactivity timer will be started with a short timeout, operating as an inactivity timeout. The mobile handset 118 will remain at power up or normal state until either a received frame from the AP will has a more data bit which indicates no more data, or until the inactivity timer expires. In FIG. 5, the process begins at block 500. The process may be implemented as one or more soft routines which are part of, for example, the WLAN Driver 220.

At block 502, the mobile handset 118 switches to a next channel in a scan list. The mobile handset 118 may select all possible channels used by the current AP or may select a subset of the active channels. At block 504, the mobile handset 118 starts a timeout timer. The timer may be operated using the time base 228 of the controller 210 or another timer such as a hardware timer.

At block 506, the mobile handset 118 sends a probe request frame. Subsequently, at block 508, the mobile handset 118 detects reception of a probe response frame from a new AP. If no probe response is received, additional probe requests may be sent or different channels may be selected. If one or more probe responses are received, at block 510, the scan table 230 is updated with the information contained in the probe responses. Also, updating the scan table 230 may include removing aged entries or other table entries which are no longer valid.

At block 512, after updating the scan table 230, the mobile handset 118 determines if the timeout timer has expired. If not, control returns to block 506 and an additional probe request is sent. The process continues in a loop until the timeout timer expires. At that time, at block 514, the WLAN Driver 220 restores the mobile handset 118 to the working channel and then signals the BB/RF/MAC routine 218 to power down the RF, base band and media access control portions of the mobile handset 118, block 516. The process ends at block 518.

Figure 6:
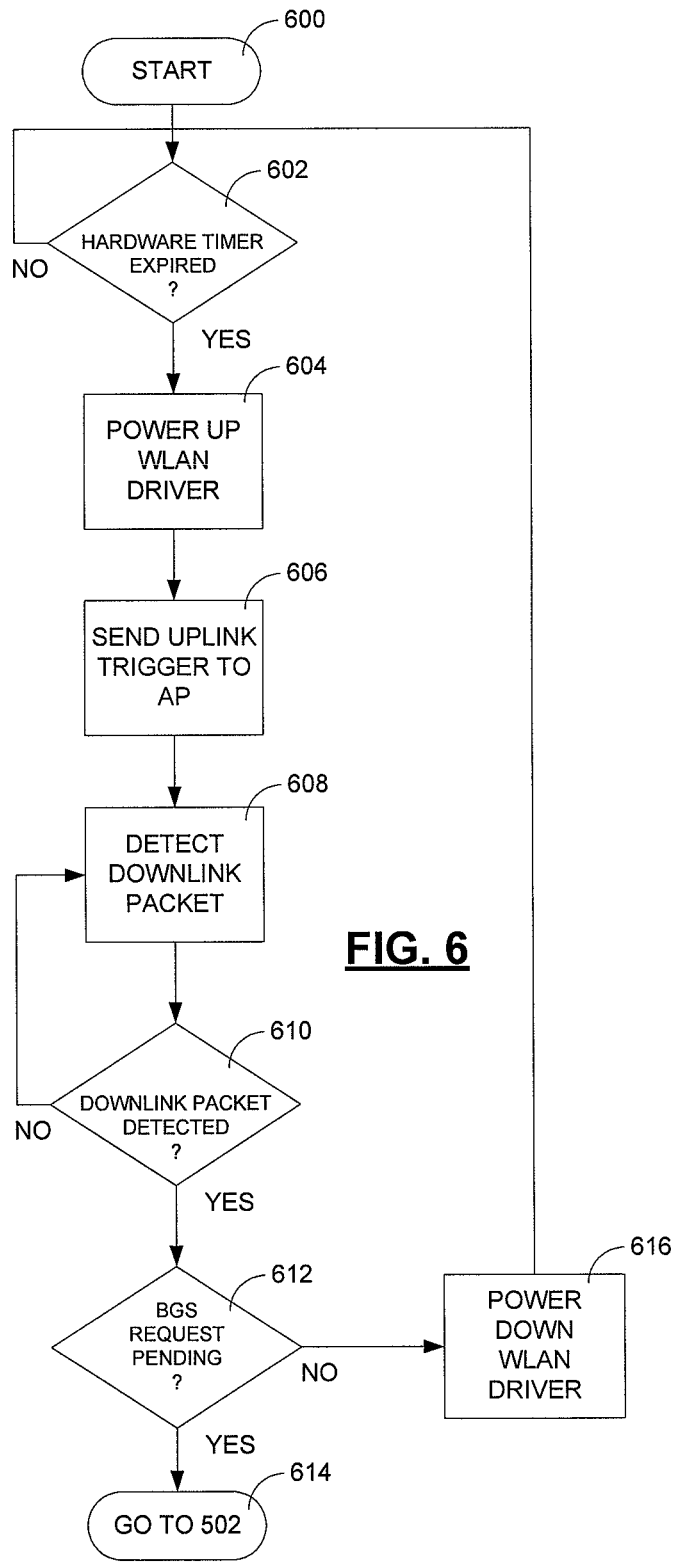

FIG. 6 is a flow diagram illustrating operation of the WLAN of FIG. 1 for operation in a Wireless Multimedia Unscheduled Automatic Power Save Delivery (WMM U-APSD) mode. The BGS procedure in U-APSD mode is similar to the legacy power save mode described above in conjunction with FIG. 5 when voice traffic is present. However, the procedure to power up and power down the WLAN Driver 222 is different in this mode. In U-APSD mode, there is a hardware timer running at regular trigger intervals. When this timer expires, the WLAN Driver 222 will power up and send an uplink trigger packet to the current AP to start a service period (SP) until the current AP sends a downlink packet indicating the end of the service period (EOSP). In some cases, the SP can be ended due to EOSP timeout. After either EOSP or EOSP timeout, the WLAN Driver 222 will normally go into power save mode. But if a BGS request is pending at the mobile handset 118, the WLAN Driver 222 will not go into power save mode and instead will start the BGS process the same way as described above.

The method of FIG. 6 begins at block 600. At block 602, the process remains in a loop until the hardware time expires. At expiration of the time, the WLAN Driver 222 is powered up to begin the BGS operation. At block 606, the mobile handset 118 sends an uplink trigger to the current AP. This begins a service period. The mobile handset 118 then waits in a loop including blocks 608, 610 until a downlink packet from the current AP is received. When the downlink packet has been received, at block 612, the mobile handset 118 determines if a background scan request is pending. This occurs, for example, if the BGS timer has expired indicating that a background scan is due. If no BGS is pending, at block 616, the WLAN Driver 222 is powered down and control proceeds to block 602.

If a BGS request is pending at block 602, control proceeds to block 502, FIG. 5. In accordance with that procedure, a probe request frame is transmitted from the mobile handset 118 and, based on received probe responses, the scan table 230 is updated.

Figure 7:
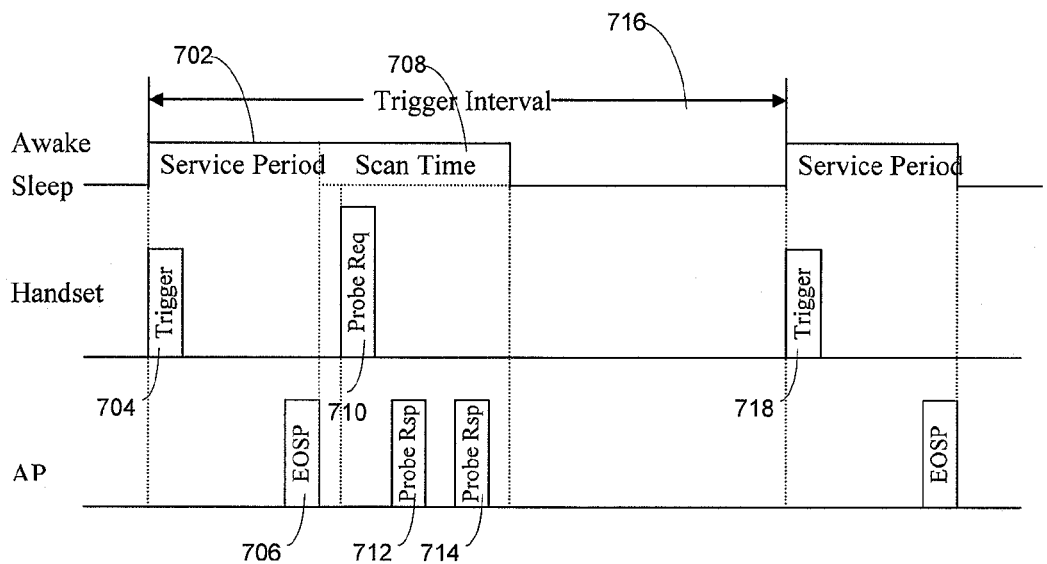
FIG. 7 is a timing diagram illustrating operation of the WLAN of FIG. 1.

FIG. 7 is a timing diagram illustrating operation of the WLAN of FIG. 1 for implementing WMM U-APSD mode of operation. The BGS process in legacy U-APSD mode is substantially the same as WMM U-APSD described above in conjunction with FIG. 6 except the end of service period is determined differently. In WMM U-APSD, EOSP is explicitly indicated by the current AP. In contrast, legacy U-APSD checks the content of a bit referred to as the more data bit. There is only one trigger from the mobile handset 118 within one service period in the case of WMM U-APSD. There could be multiple power save poll frames (PS-POLLs) from the mobile handset 118 in case of legacy U-APSD. In 802.11 systems, the PS-POLL procedure provides that a station in power save mode can solicit an immediate frame delivery from the current AP by sending a PS-POLL frame to the AP.

The background scan procedure for the legacy U-APSD mode is illustrated in FIG. 7. In the drawing figure, the operation of the mobile handset 118 is illustrated in the upper portion of the figure. The operation of an AP such as AP 102, 104 is illustrated in the lower portion of the figure.

In this mode, a service period 702 begins when the mobile handset 118 sends a trigger frame 704. The service period 702 ends when the AP transmits an EOSP frame 706. When the service period 702 ends, a scan time 708 begins. During the scan time 708, the mobile handset 118 is able to update the scan table 230. The mobile handset 118 transmits a probe request frame 710. In response, APs which detect the probe request frame 710 transmit one or more probe response frames 712, 714. Information required to update the scan table 230 is contained in the probe response frames 230.

A trigger interval 716 extends from the time of transmission of the trigger frame 704 until transmission of a second trigger frame 718. The mobile handset 118 may transmit the trigger frame, for example, in response to timeout of a BGS timer, when the mobile handset 118 determines it should update the scan table 230. During subsequent trigger intervals, the mobile handset 118 continues to update the scan table 230.

Figure 8:
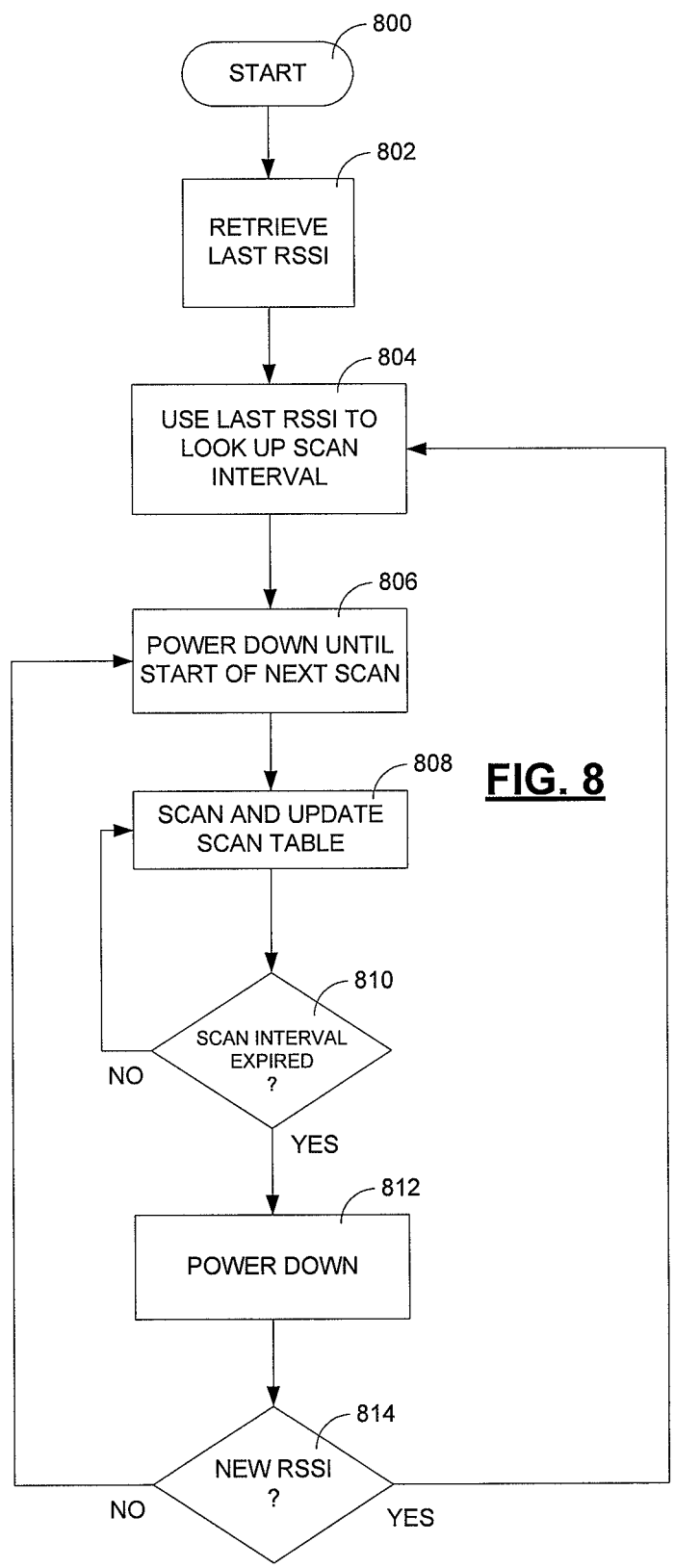
FIG. 8 is a flow diagram illustrating operation of the WLAN of FIG. 1.

FIG. 8 is a flow diagram illustrating operation of the WLAN of FIG. 1 to implement an adaptive background scan procedure. In this embodiment, whenever a background scan is required to update the scan table 230, more power will be consumed by the mobile handset 118 in sending a probe request and waiting for responses from nearby APs. One way to reduce power consumption is to follow an adaptive BGS procedure. In an adaptive BGS procedure, a heuristic formula or lookup table is used to convert a signal parameter such as RSSI to a scan interval. In one embodiment, this is done in such a way that the stronger the RSSI, the longer the scan interval. The scan interval is related to value of the signal parameter. Parameters of the signal parameter or the scan interval may be configured for a particular application. For example, the scan interval may vary between the configured maximum and minimum scan intervals.

To ease implementation, a table lookup method may be used. The RSSI can be easily converted into an index which is then used to look up the table for a scan interval. Other methods of converting a signal parameter, such as by calculating a value, may be used as well.

FIG. 8 illustrates one such method. In FIG. 8, the method is illustrated using received signal strength as the signal parameter. However, any suitable signal parameter may be used. The method begins in block 800.

At block 802, the last RSSI value is retrieved from storage in memory. At block 804, the last RSSI value is used to look up a scan interval. For example, a table of scan interval values may be stored in memory. The retrieved RSSI value is used as an index to obtain the appropriate scan interval value. The relation between RSSI values and scan interval values may be determined in any suitable value, such as by making empirical measurements or by calculation.

At block 806, the mobile handset 806 enters a power save mode to await the start of a next scan. For example, under control of the dynamic power management routine 224, substantially all of the mobile handset 118 may be shut down to reduce power consumption. At block 808, the mobile handset 118 is powered up and a scan operation begins. For example, the mobile handset 118 may transmit probe request frames so that nearby APs respond with probe response frames, or the mobile handset 118 may receive beacon frames from APs which are nearby. Using information contained in the probe response frames or beacon frames, the mobile handset 118 updates the scan table.

At block 810, the mobile handset 118 determines if the scan interval has expired. The scan interval may be timed by a scan timer under control of the time base 228. If the timer has not expired, control returns to block 808 to continue scanning and updating the scan table.

If the timer has expired, control proceeds to block 812. The mobile handset 118 powers down portions such as the RF and base band sections to reduce power consumption. At block 814, the mobile handset 118 determines if a new RSSI value has been received. If not, control returns to block 806 and the mobile handset 118 enters the power save mode until the start of the next scan period. The start of the next scan period is set by the scan interval which is determined based on the RSSI value. On the other hand, if a new RSSI value is available at block 814, control proceeds to block 804. There, the new RSSI value is used to look up a new scan interval.

In this manner, the scan interval is varied along with the RSSI value. When RSSI is strong because the mobile handset is in an area with good radio coverage from the current AP, the scan interval is extended to a longer duration. Thus, the radio is powered down more and power consumption is reduced. On the other hand, when RSSI is weak because the mobile handset 118 is in a fade or fringe area, such as at the edge of the coverage area of the current AP, the scan interval is decreased and BGS occurs more often. This lets the mobile handset 118 locate the best candidate AP for roaming at a time when roaming is becoming more likely.

Figure 9:
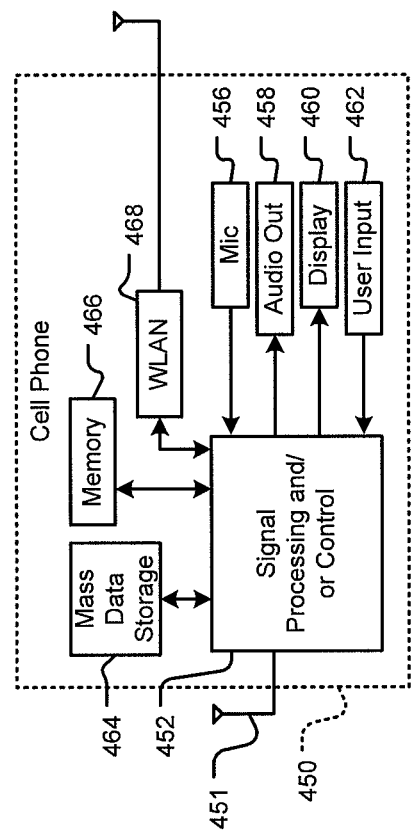
FIG. 9 is a functional block diagram of a cellular phone.

Referring now to FIG. 9, one exemplary implementation of the present invention is shown. In FIG. 9, the present invention may be embodied in a cellular phone 450 that may include a cellular antenna 451. The present invention may implement either or both signal processing and/or control circuits, which are generally identified in FIG. 9 at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468. For mobility within the WLAN, the cellular phone 450 may implement the techniques for roaming described herein.

It is intended that the foregoing detailed description be understood as an illustration of selected forms that the invention can take and not as a definition of the invention. It is only the following claims, including all equivalents, that are intended to define the scope of this invention.

What is claimed is:

1. A Voice Over Internet Protocol (VoIP) telephone comprising:
a radio circuit configured to:
  communicate with a current access point (AP) and other APs of a wireless communication network;
a memory configured to store a scan table which includes information about candidate APs of the wireless communication network, the candidate APs including at least the other APs, the information obtained from transmissions received by the radio circuit from the candidate APs; and
a controller coupled with the radio circuit and the memory and operable to:
  associate with the current AP;
  while associated with the current AP
    scan for candidate APs on the wireless communication network during a plurality of scan intervals, wherein the controller, in order to scan for the candidate APs, is configured to transmit probe requests to receive the transmissions during the plurality of scan intervals;
    identify a strength of communication with the current AP;
    set durations for the plurality of scan intervals based on the identified strength of communication; and
    initiate a roaming process when communication between the VoIP telephone and the current AP degrades to a degraded level, the controller including an application to select a best candidate AP from the scan table, to hand over a voice call by terminating the voice call with the current AP and to resuming the voice call through the radio circuit with the best candidate AP.

2. The VoIP telephone of claim 1, wherein the transmissions comprise probe responses sent in response to the probe requests, the VoIP telephone further comprising:
an application operative in conjunction with the radio circuit to update the scan table in the memory with information received in the probe responses.

3. A method for operating a voice communication device in a wireless communication network, the method comprising:
while the voice communication device is associated with a current access point (AP):
  transmitting, with the voice communication device, probe requests to scan for candidate APs during a plurality of scan intervals;
  identifying, with the voice communication device, a strength of communication with the current AP;
  setting, with the voice communication device, durations for the plurality of scan intervals based on the identified strength of communication;
  receiving, with the voice communication device, probe responses to the probe requests, the probe responses comprising information about the candidate APs; and
  storing, with the voice communication device, the information about the candidate APs in a scan table; and
when a signal parameter for radio communication between the voice communication device and the current AP degrades to the degraded level, roaming, with the voice communication device, to one of the candidate APs based on the information stored in the scan table.

4. The method of claim 3
wherein transmitting the probe requests comprises transmitting, with the communication device, the probe requests during inactive periods of the voice communication device; and receiving, with the voice communication device, the probe responses from the candidate APs during the inactive periods.

5. The method of claim 3 further comprising:
updating information in the scan table when new transmissions from the candidate APs or a transmission from a new candidate AP are received.

6. The method of claim 5 wherein updating comprises:
removing an entry from the scan table when the entry ages beyond a predetermined time duration.

7. The method of claim 3 wherein storing information about the candidate APs comprises storing data about a signal parameter for a received radio communication from a transmitting candidate AP.

8. The method of claim 7 wherein storing information comprises storing a received signal strength indication value.

9. The method of claim 3 wherein roaming comprises:
identifying a best candidate AP among the candidate APs in the scan table; and
sending an authenticating communication to the best candidate AP.

10. The method of claim 9 wherein roaming further comprises:
exchanging authentication messages with an authentication server on the wireless communication network; and
exchanging handshaking messages with the new candidate AP.

11. The method of claim 3 wherein roaming comprises:
discontinuing a voice call with the current AP; and
commencing the voice call with the new candidate AP without interrupting the voice call.

12. The method of claim 3 further comprising assessing a quality of the communication link between the current AP and the communication device before roaming.

13. The method of claim 12 wherein assessing the quality of the communication link comprises comparing a value of a signal parameter with a threshold value.

14. A mobile handset for voice communication with a wireless local area network (WLAN), the mobile handset comprising:
a radio communication circuit to communicate a voice call with one or more remote access points (APs);
a memory; and
a controller coupled to the radio communication circuit to control transmission and reception of information with the one or more APs, the controller operable to associate with a current access point (AP);
retrieve from the memory a last-measured received signal strength value during a call between the mobile handset and the current AP on a first radio channel;
using the last-measured received signal strength value, determine a background scan interval;
switch a radio channel on which the radio communication circuit communicates from a first channel to a second channel;
during the background scan interval and while associated with the current AP:
communicate a probe request to identify other APs available for voice communication with the mobile handset, and
receive any probe responses to the probe requests;
retrieve AP identification information from received probe requests;
update a scan table stored in the memory with the retrieved AP identification information; and
when the background scan interval expires, enter a power save state.

15. The mobile handset of claim 14, wherein the background scan interval comprises one of a plurality of different background scan intervals, the mobile handset further comprising:
a lookup table stored in the memory to store the plurality of different background scan interval values corresponding to a plurality of different signal strength values, and
wherein the controller is further operative to provide the last-measured received signal strength value as an index to the lookup table to determine the background scan interval.

16. The VoIP telephone of claim 1, wherein the controller is further operable to scan for the candidate APs while a quality of a communication link between the current AP and the radio circuit is above a degraded level.

17. The VoIP telephone of claim 1, wherein the controller, in order to set a duration for one of the plurality of scan interval, is operable to:
retrieve a last stored signal strength indicator value to identify the strength of communication;
select one of a plurality of different scan interval values corresponding to the last stored signal strength indicator, and
set the duration to the selected one of the plurality of different scan interval values.

18. The method of claim 3, wherein transmitting the probe requests comprises transmitting, with the voice communication device, the probe requests while a quality of a communication link between the voice communication device and the current AP is above a degraded level.

19. The method of claim 3, further comprising:
selecting, with the voice communication device, one of a plurality of different scan interval values corresponding to the identified strength of communication,
wherein setting the durations for the scan intervals comprises setting, with the voice communication device, a duration for a scan interval to the selected one of the plurality of different scan interval values.

20. The mobile handset of claim 14, wherein the controller is further operable to communicate the probe requests while a quality of the communication link between the current AP and the radio communication circuit is above a degraded level.

21. The mobile handset of claim 14, wherein the last-measured received signal strength value comprises one of a plurality of measured received signal strength values, and wherein the controller is operable to determine the background scan interval using the last-measured received signal strength value according to an adaptive background scan procedure that varies durations for the plurality of background scan intervals as the plurality of measured received signal strength values vary.

* * * * *